(No Model.) 3 Sheets—Sheet 1.
C. N. BRADY.
APPARATUS FOR MAKING GLASS VESSELS.
No. 428,713. Patented May 27, 1890.
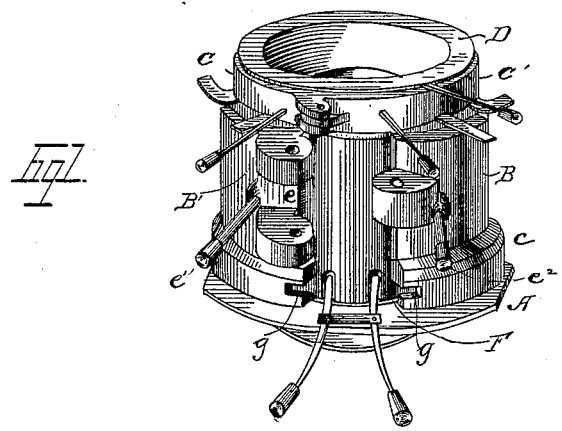
Fig. 1.
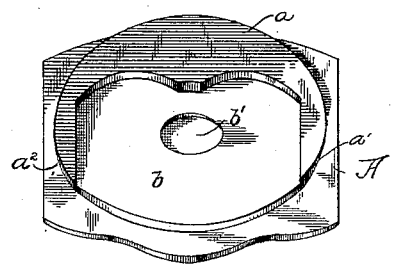
Fig. 2.
Fig. 3.
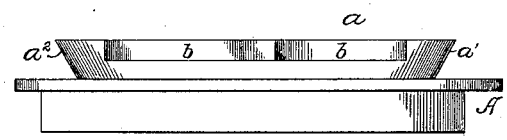
WITNESSES
E. F. Berry
A. B. Dyer
INVENTOR
Charles N. Brady
By Geo W Dyer
Attorney (No Model.) 3 Sheets—Sheet 2.

C. N. BRADY.
APPARATUS FOR MAKING GLASS VESSELS.

No. 428,713. Patented May 27, 1890.

Witnesses
E. S. Berry
S. W. Dyer

Inventor
Charles N. Brady
By Geo. W. Dyer
Attorney (No Model.) 3 Sheets—Sheet 3.
C. N. BRADY.
APPARATUS FOR MAKING GLASS VESSELS.
No. 428,713. Patented May 27, 1890.
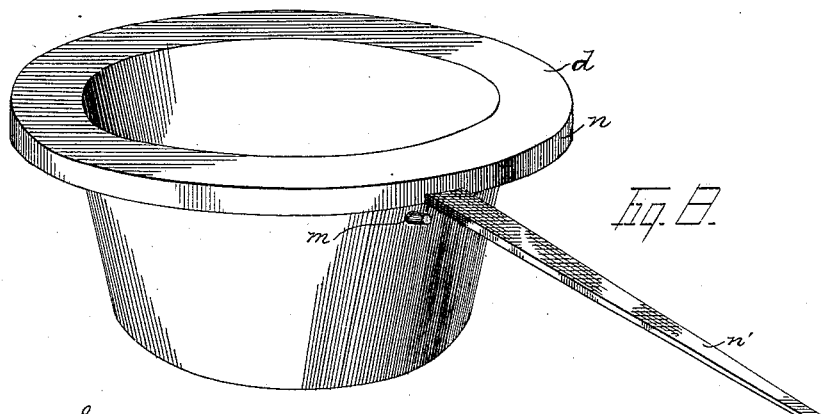
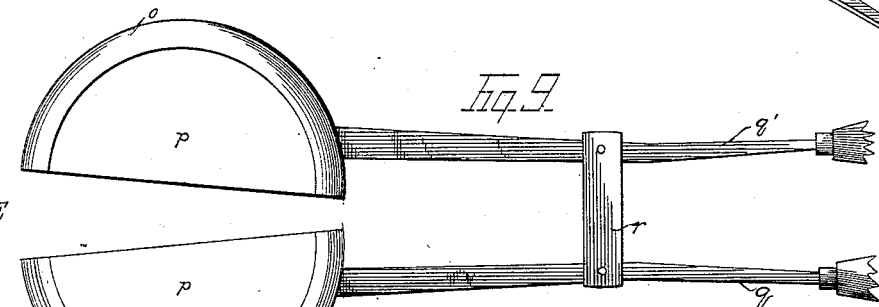
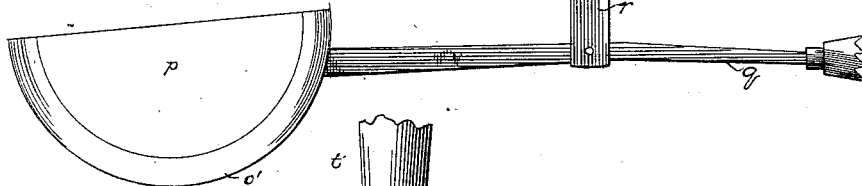
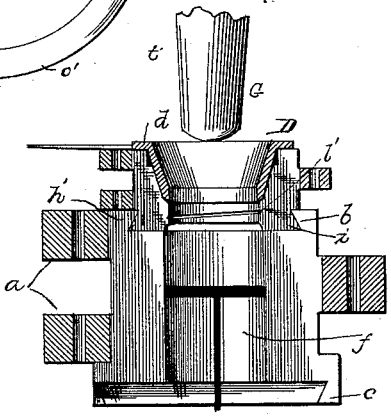
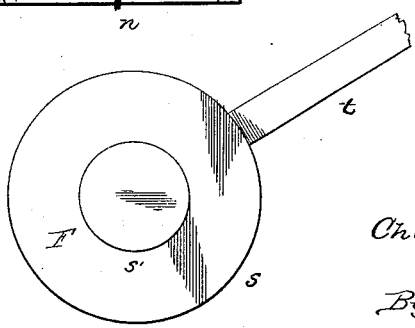
Witnesses
Inventor
Charles N. Brady.
By Geo. W. Dyer.
Attorney

UNITED STATES PATENT OFFICE.

CHARLES N. BRADY, OF WASHINGTON, PENNSYLVANIA.

APPARATUS FOR MAKING GLASS VESSELS.

SPECIFICATION forming part of Letters Patent No. 428,713, dated May 27, 1890.

Application filed April 20, 1888. Serial No. 271,264. (No model.)

*To all whom it may concern:*

Be it known that I, CHARLES N. BRADY, a citizen of the United States, residing at Washington, in the county of Washington and State of Pennsylvania, have invented certain new and useful Improvements in Apparatus for Making Glass Vessels; and I do hereby declare the following to be a full, clear, and exact description of the invention, which will enable others skilled in the art to which it appertains to make and use the same.

My invention relates to certain new and and useful improvements in apparatus for making vessels of glass with threaded necks.
It has been found that the vessels in the above class of ware as heretofore made have been more or less imperfect at the threaded portion of the neck—as, for instance, the so-called "Mason jars"—and that these imperfections have arisen from the inefficiency of the methods employed in forcing the molten glass into the threaded portion of the mold and in the mold itself, and there has been also a large expense and waste of time and material and destruction of the article in breaking off the overflow of such vessels and in grinding down the outer edge of the neck.

It is the object of my invention to overcome these defects and objections as well as to cheapen the manufacture and make the products of the same more perfect.

For a more thorough understanding of the various parts in detail, attention is invited to the accompanying drawings, wherein like letters of reference indicate identical parts in the several views, and in which—

Figure 4:
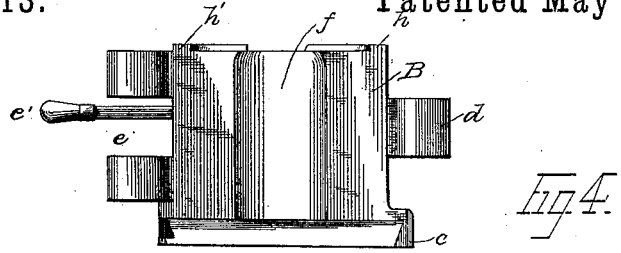
Figure 5:
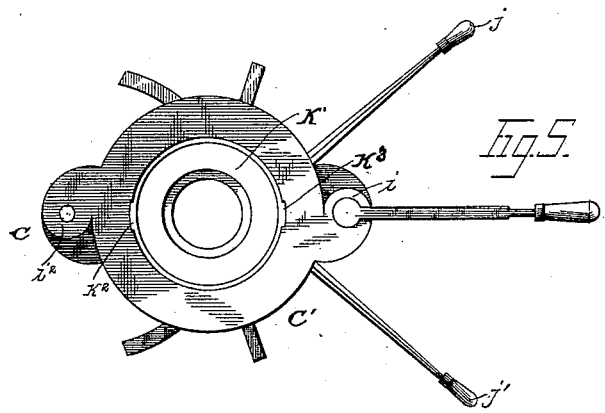
Figure 6:
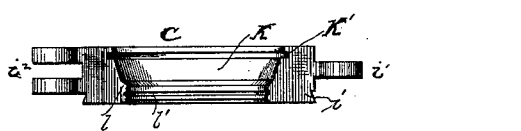
Figure 7:
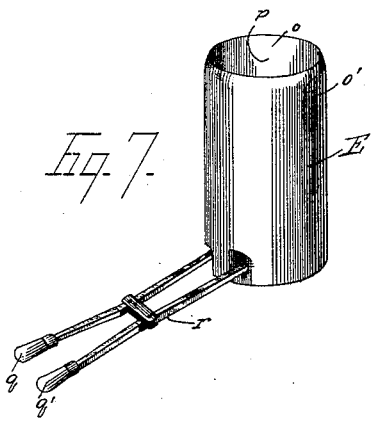

Figure 1 is a perspective view of the molds with the lower one partly open; Fig. 2, a perspective view of the base; Fig. 3, a side elevation of the same; Fig. 4, an elevation of one section of the lower or body-forming mold; Fig. 5, a top elevation of the upper or neck-forming mold; Fig. 6, an elevation of one of the sections of the upper mold; Fig. 7, a perspective view of the inner mold; Fig. 8, a perspective view of the plunger-guide; Fig. 9, a top elevation of the inner mold, and Fig. 10 a sectional view of a modification of the device; Fig. 11, a plan view of the base F.
The base A, made, preferably, of metal, as is indeed all the other parts of the mold, is provided with the disk-shaped projection $a$, having inwardly-inclined sides $a'$ and $a^2$, and the cylindrical opening $b$, which is chambered out at $b'$. The lower mold B B' is provided with the flange $c$, inclined on its interior and engaging with the inclined sides $a'$ $a''$ of the base A, which engagement serves to lock the two securely together, when the sections B B' are closed and the flange $c$ thereby brought into contact with the sides $a$ $a''$. This mold is also provided with the pivoting-hinge $d$, locking-hinge $e$, manipulating-handles $e'$ $e''$, and with the central chamber $f$, extending the whole length of the same and of the form desired for the article to be made. For reasons hereinafter explained the flange $c$ is provided with an opening $g$ at the meeting point of the two sections B B', which opening permits of free communication with the chamber $f$ through the chambered portion $b$ of the base.

On the top of the mold B B' are the two dovetailed flanges $h$ $h'$, and engaging with these flanges is the inclined lower portion $i$ of the upper mold C C'. This upper mold is provided with the locking-hinge $i'$, the pivoting-hinge $i''$, the manipulating-handles $j$ $j'$, and is further provided with the chamber $k$ therein, and it is also provided with the slot $k'$, having openings $k''$ $k'''$ thereto. The upper part of the chamber $k$ inclines slightly inward until the shoulder or projection $l$ is reached, from whence the chamber continues cylindrically downward. The interior walls of the mold around this latter cylindrical continuation of the chamber $k$ are provided with the reversed continuing screw-threads $l'$, which are to be imprinted in the article, as will be more fully hereinafter described. Adapted to fit securely in the inclined upper portion of the chamber $k$, and provided with projections $m$ $m'$, adapted to enter the openings $k''$ $k'''$ and engage with the slot $k'$, is the plunger-guide D, having the flange $n$ fitting over the upper end of the upper mold and further provided with the operating-handle $n'$.

When all the above-mentioned parts are properly fitted together, as shown and described, the joints should be very perfect, and the only openings connecting with the interior of the whole are at the top and through the opening $g$.

Adapted to fit inside of the chamber $f$ during one stage of the process is a hollow inner mold E. The inner mold E is made of the two sections $o$ $o'$ of the general form when closed of the chamber $f$, and having the cylindrical chamber $p$ therein. Secured each to one section $o$ $o'$ is a double handle $q$ $q'$, both joints of which are jointed together by the link $r$. When the inner mold E is inserted in the chamber $f$, the two handles $q$ $q'$ should project out through the opening $g$. During another stage of the operation the inner mold E is replaced by a base F. This base F is simply a disk $s$, of the diameter of the chamber $f$, preferably slightly concave on its upper face, provided with the cylindrical projection $s'$ on its lower face, engaging with the opening $b$, and having the handle $t$ extending out through the opening $g$. A plunger G, operated by any suitable mechanism under the control of the operator, and having a cylindrical portion $t'$ of the length but made slightly smaller in diameter than the threaded chamber $k$ and chamber $p$ in the inner mold E, is adapted to enter the plunger-guide D.

In the modification illustrated by the tenth figure the two molds are shown as fastened together as above described, but with the following points of difference in their construction: The inner mold E is dispensed with, and inside of the chamber $f$ is placed, of the diameter of said chamber, a piston $n$, preferably normally held upward by spring-pressure, and adapted to be withdrawn by a lever manipulated by the foot of the operator to such a distance that the completed jar may be removed from the bottom of said chamber.

When vessels of glass having a shoulder beneath the shoulder-neck are made by the device first described, the incline for forming such a shoulder is made in the lower mold, as shown in Figs. 1 and 4; but in the modification this incline is made in the upper mold, directly below the threads $l$, so that the chamber $f$ is nearly cylindrical, but preferably a little larger at the bottom, and the piston $n$ thereby is at liberty to move freely within the same, and the vessel is more easily removed from the mold.

The method of operation with the principal device is as follows: The lower mold is locked upon the inner mold E, inside of the same, and upon the lower portion of the upper mold, into which the plunger-guide G is mounted, as before described. A sufficient quantity of molten glass is now dropped through the plunger-guide D into the chamber $p$ of the inner mold E. The plunger G now enters the plunger-guide D, threaded portion $b'$, and chamber $p$, and forces the molten glass therein up against the threads $l'$ and shoulder $l$, by which its upward progress is arrested, and the neck is formed. The lower mold is now opened and the inner mold E removed, care being taken to disengage it from the molten glass by separating its sections $o$ $o'$ by means of the handles $q$ $q'$. After the inner mold E has been removed it is instantly replaced by the base F and the lower mold closed. The plunger is withdrawn and the guide D removed, although this latter step is not absolutely necessary if the joint with the upper mold is comparatively air-tight, and a pipe with a suitable nozzle inserted in the upper portion of the chamber $k$, after which a blast of compressed air, which may be heated air or steam, is applied thereto, blowing out the molten glass against the sides of the lower mold, and thereby forming the body of the article. The upper and lower molds are now opened and the finished article removed, after which the work progresses, as before.

When the modification shown in Fig. 10 is used, the piston $n$ is advanced near the top of the chamber $f$ and the molten glass dropped therein. The plunger is now inserted and forms the neck and threads, as above. After this neck has been formed the piston $n$ is withdrawn to the farther end of the chamber $f$ and the blast applied, thereby forming the body, and when the same is formed the plunger portion is removed such a distance as will permit the jar thus made to drop out of the mold a sufficient distance for removal.

Having now described my invention, what I claim, and desire to secure by Letters Patent, is—

1. The combination of the base A, having inclined sides $a'$ $a^2$, and with the cylindrical opening $b$, and chamber $b'$, the lower mold B B', having a flange $c$ engaging with the inclined sides $a'$ $a^2$, of the base, and provided with manipulating-handles, and with a central chamber $f$, and with a double dovetail flange $h$ $h'$ at its upper end, the upper mold C C', engaging with these dovetail flanges and screw-threaded at the lower part of its interior and inclined at the upper part thereof, and a plunger-guide $k$, engaging with said inclined portion, all combined and arranged substantially as herein set forth.

2. In an apparatus for making glass vessels, the combination of the base A, the lower mold B B', the upper mold C C', having slots $k^2$ $k^2$, a plunging-iron D, having studs $m$ engaging with said slots $k^2$, and a removable inner mold E, substantially as set forth.

In testimony whereof I affix my signature in presence of two witnesses.

CHARLES N. BRADY.

Witnesses:
FRANK L. DYER,
EDW. H. BERRY.